W. R. NICOLL.
BUTTER MAKING MACHINE.
APPLICATION FILED APR. 27, 1916.

1,275,978.

Patented Aug. 13, 1918.
2 SHEETS—SHEET 1.

Witness:
R. L. Farrington

Inventor:
William R. Nicoll
By Brown, Nissen & Sprindle,
Attys

W. R. NICOLL.
BUTTER MAKING MACHINE.
APPLICATION FILED APR. 27, 1916.

1,275,978.

Patented Aug. 13, 1918.

2 SHEETS—SHEET 2.

Witness:
H. L. Farrington

Inventor:
William R. Nicoll
By Brown, Nissen & Sprinkle
Attys

UNITED STATES PATENT OFFICE.

WILLIAM R. NICOLL, OF OWATONNA, MINNESOTA, ASSIGNOR TO DAVIS-WATKINS DAIRYMEN'S MFG. CO., OF NORTH CHICAGO, ILLINOIS, A CORPORATION OF DELAWARE.

BUTTER-MAKING MACHINE.

1,275,978.  Specification of Letters Patent.  Patented Aug. 13, 1918.

Application filed April 27, 1916. Serial No. 93,818.

*To all whom it may concern:*

Be it known that I, WILLIAM R. NICOLL, a citizen of the United States, residing at Owatonna, in the county of Steele and State of Minnesota, have invented certain new and useful Improvements in Butter-Making Machines, of which the following is a specification.

This invention relates to a butter making machine, but more particularly to the construction in such a machine for supporting butter working rollers at the ends of a rotatable drum and for preventing undue wearing of the drum heads, caused by the parts becoming loose in the drum head and thereby causing leakage.

The principal object of the invention is to provide a new and improved construction, combination and arrangement of parts by means of which the butter working rollers are more securely mounted for rotation in the receptacle.

Figure 1:
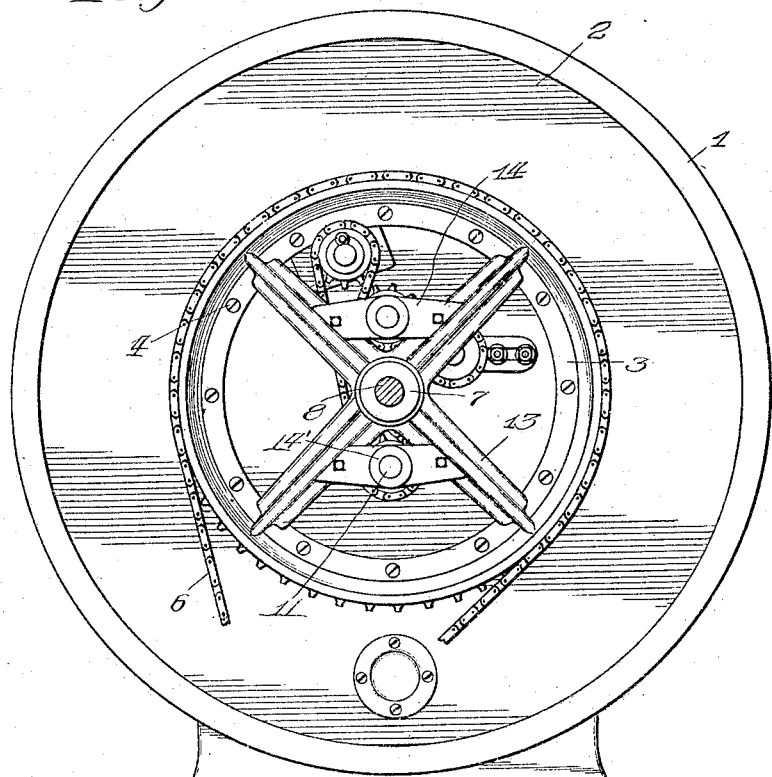
Figure 5:
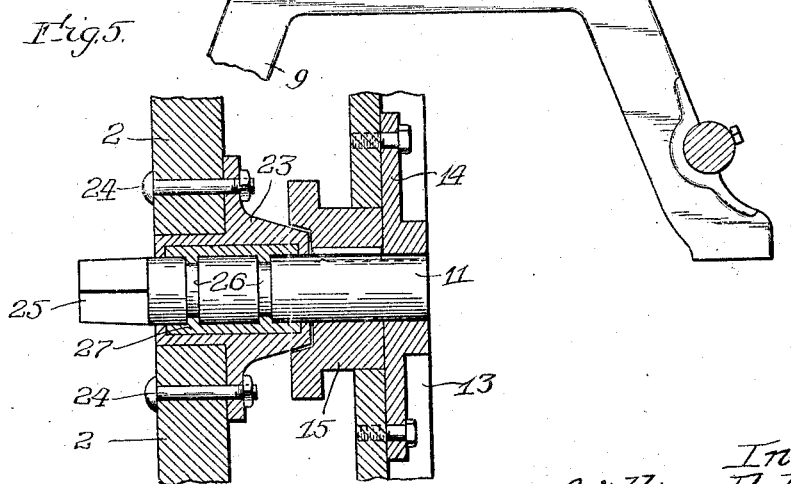
Figure 2:
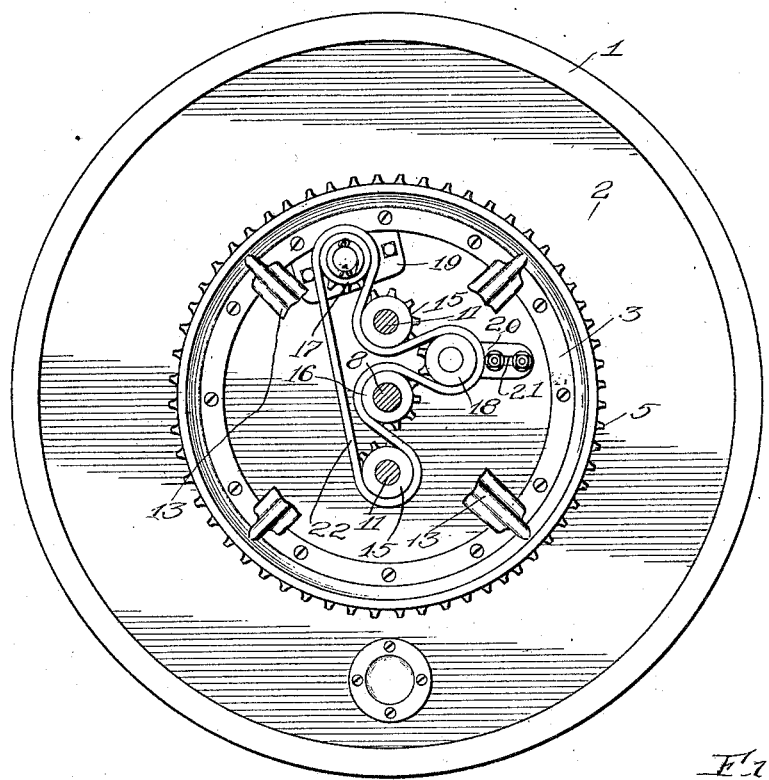
Figure 3:
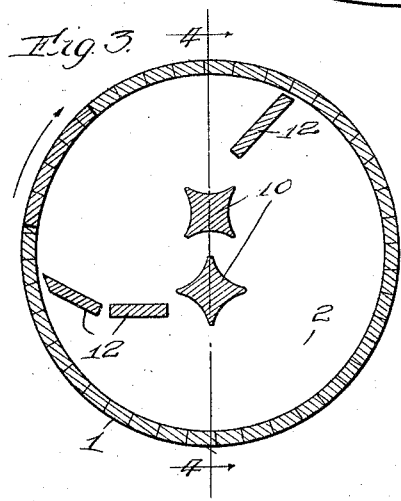
Figure 4:
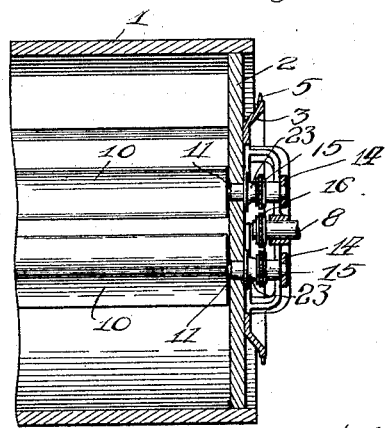

In the accompanying drawings, Figure 1 is an end elevation of a butter making machine with its parts constructed in accordance with the principles of the invention; Fig. 2 is an end view of the mechanism with parts of the bearing spider broken away for showing the driving connection more clearly; Fig. 3 is a sectional view of the butter making machine; Fig. 4 is a sectional view taken on the line 4—4 of Fig. 3; and Fig. 5 is a section of a liquid tight joint.

If the butter working rollers are mounted directly in the ends of the drum or butter working receptacle, with a driving pinion on the outside of the drum in connection therewith, it is difficult in the first place to provide a suitable fluid tight bearing, and in the second place, since the bearing surface is so small, it is difficult to prevent such a bearing from becoming loose. This difficulty is overcome in the present invention by mounting the ends of the rollers not in the drum itself but in a spider which is secured to the drum and which has a much better and more secure connection with the drum, and by merely providing that portion of the shaft of the rollers which extends through the drum proper with a fluid tight connection.

Referring now more particularly to the drawings, the numeral 1 designates generally a butter making drum or receptacle, usually constructed of wood and formed at the ends with flat drum heads 2, to which spiders 3 are secured in any suitable manner, as for example by means of bolts 4 spaced around the periphery of the spider at frequent intervals to secure it firmly to the drum head. The spider may be formed with teeth 5 over which a driving chain 6 passes and at the center of the spider is a bearing 7 and a shaft 8 by means of which the drum may be mounted for rotation about a horizontal axis in the bearing standards 9 at the ends thereof. The shaft 8 rotates freely within the bearing portion 7, and the bearing portion is rotatably mounted in the bearing standards 9.

Within the drum, as shown more clearly in Fig. 3, are butter working rollers 10 which are mounted at the ends upon shafts 11 which extend through the drum heads 2 and form a fluid tight connection therewith. These rollers are preferably spaced from the axis of rotation of the drum itself, and between the rollers and the inner surface of the drum are shelves or flights 12 for directing the cream and butter against the rollers 10 as the drum is rotated for churning the cream and working the butter.

The spider 3 is formed with a plurality of arms 13. A bracket 14 is secured to two adjacent arms of the spider and is formed with a bearing 14′ in which the shaft 11 of the butter working roller is mounted. One of these brackets is provided for each end of each of the butter working rollers, so that the bearing and wear due to the rotation of the roller is not given to the drum head which, being made of wood, quickly becomes worn, but is securely attached to the spider which has a secure fastening to the drum head between the bearing brackets 14 and the drum head. At one end of the receptacle are gears 15 secured to the shafts 11.

In order to rotate the butter working rollers in opposite directions, as shown in Fig. 3, the shaft 8 is provided with a gear 16, and two idler gears 17 and 18 are provided, the former having a bracket 19 fixed to the drum head 2, and the latter having a bracket 20 with a slot 21 for adjusting the position of the gear 18 toward and from the other gears. Around all of these gears an endless chain 22 is passed, as clearly shown in Fig. 2, so that when the shaft 8 is rotated, the butter working rollers 10 may be operated independently of the rotation of the drum or receptacle itself, and therefore at different speeds and in reverse directions.

With this description, it is obvious that the bearing pressure of the rollers 10 does not come on the drum head, but comes instead upon the spider. There is therefore little tendency to wear out the drum head around the butter working roller shafts, thereby reducing the tendency to leak around these shafts and making it much easier to pack the shafts in their passage through the drum head. This also prevents cramping or binding of the butter working roller shafts and makes the construction more durable and less liable to breakage.

A liquid tight joint for shafts 11 is shown in Fig. 5, comprising a gland member 23 fitting tightly in the drum head 2 and secured thereto by bolts 24. The inner end 25 of each shaft 11 is preferably squared so that the roller 10 within the drum may be readily attached or removed, and that portion of the shaft within the gland is formed with annular grooves 26 which become filled with babbitting 27 placed in recess 28 of the gland, thereby forming a fluid tight joint between the drum head and the shaft. Sprocket 15 is keyed to the shaft between the gland and the bearing bracket.

I claim:

1. In a butter making machine, a rotatable receptacle, a roller drive therefor, comprising a driving spider secured to the end thereof with radial arms spaced from the end of the receptacle, a bearing bracket secured to the arms, and a butter-working roller having a shaft extending through the end of the receptacle and with its end mounted in the bracket.

2. In a butter making machine, a rotatable receptacle, a roller drive comprising a spider secured to the end thereof with radial arms spaced from the end of the receptacle, a bearing bracket secured at its ends to the arms, a butter working roller having a shaft extending through the end of the receptacle and mounted in the bracket, and a driving gear secured to the shaft adjacent the said bearing bracket.

3. In a butter making machine, a rotatable receptacle, a roller drive comprising a spider secured to the end thereof with radial arms spaced from the end of the receptacle and with a central hub, a bearing bracket secured to the arms at a distance from the hub, a butter working roller having a shaft extending through the end of the receptacle and with its end mounted in the bracket, a gear secured to the shaft between the arms and the end of the receptacle, a shaft extending through the hub with a gear secured thereto in line with the other gear, and a driving chain extending around the gears.

4. In a butter making machine, a rotatable receptacle, a roller drive comprising a driving spider secured to the end of the receptacle with radial arms spaced from the receptacle, a bearing bracket secured at its ends to adjacent arms, a butter working roller having a shaft extending through the end of the receptacle and with its end mounted in the bracket, a driving shaft mounted in the spider but not extending through the end of the receptacle, a gear secured thereto, an idler gear, means for adjustably mounting the idler gear on the end of the receptacle in line with the other gears, and a driving chain extending around all of the gears for moving them at the same time.

5. In a butter making machine, a rotatable receptacle, a roller drive therefor comprising a driving spider secured to the end of the receptacle with radial arms spaced from the end of the receptacle, a bearing bracket secured to the arms, and a butter working roller within the receptacle having a shaft extending through the end of the receptacle with its end mounted in the said bracket, a driving gear secured to the shaft adjacent the bracket, and a fluid tight connection at the end of the receptacle for the shaft which passes through it.

In testimony whereof I have signed my name to this specification, in the presence of two subscribing witnesses, on this 20th day of April A. D. 1916.

WILLIAM R. NICOLL.

Witnesses:
CARL K. BENNETT,
G. B. BENNETT.

Copies of this patent may be obtained for five cents each, by addressing the "Commissioner of Patents, Washington, D. C."